April 12, 1938. L. O. DAVIS 2,114,247
YIELDABLE COUPLING
Filed July 29, 1936 2 Sheets-Sheet 2
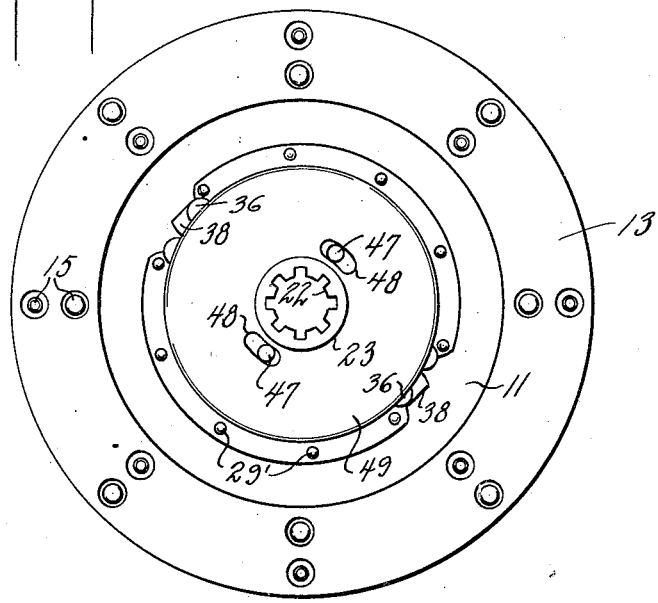
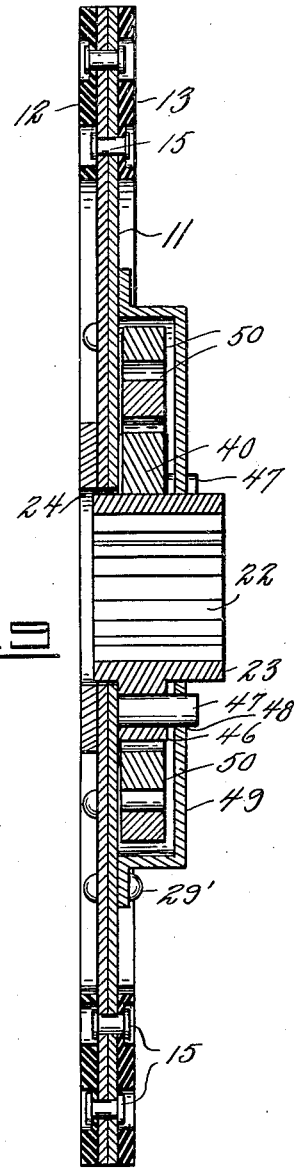
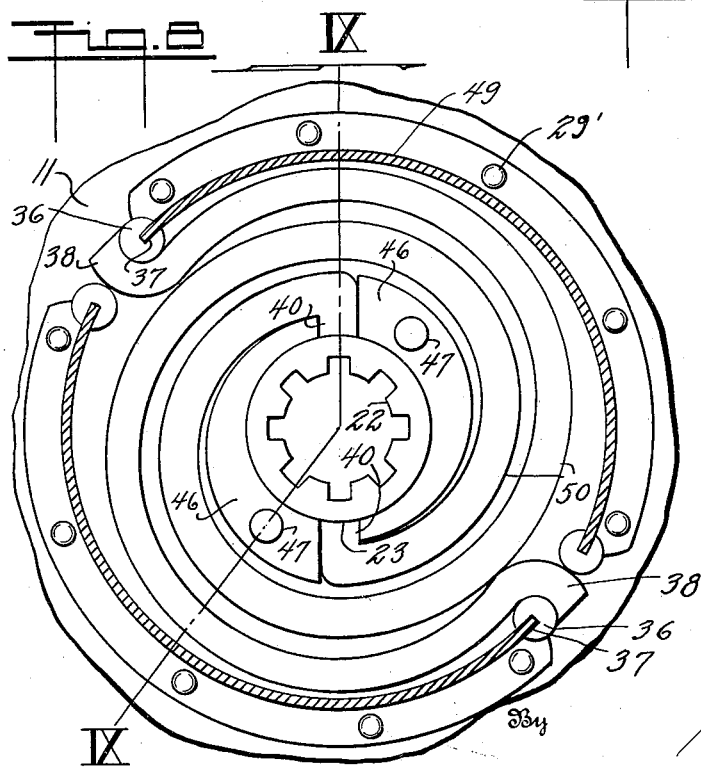
Inventor
Latta O. Davis
By Geo E Kirk
Attorney Patented Apr. 12, 1938

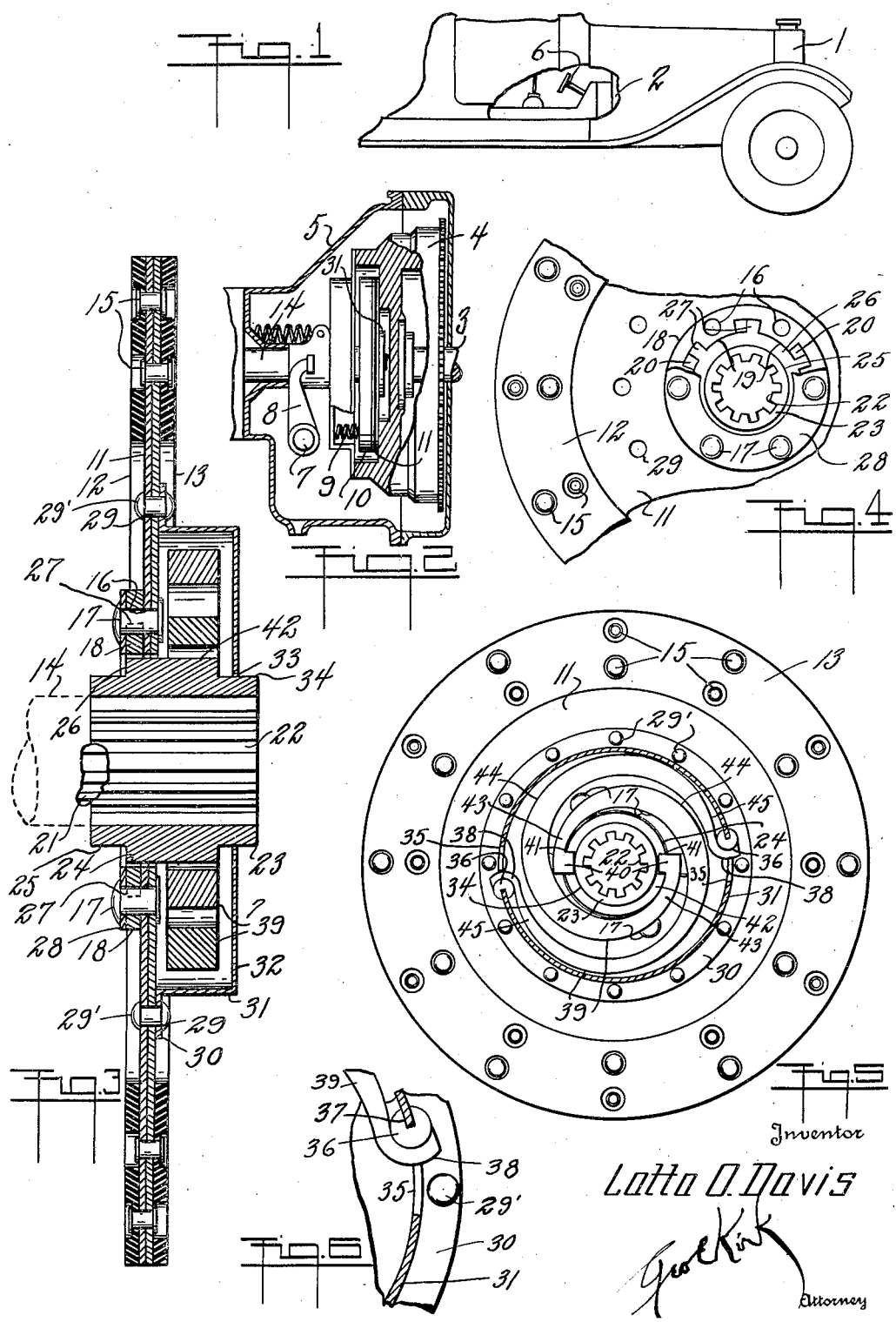

2,114,247

UNITED STATES PATENT OFFICE 2,114,247

YIELDABLE COUPLING

Latta O. Davis, Greenfield, Ind., assignor of one-half to Sheldon B. Cooper, Greenfield, Ind.

Application July 29, 1936, Serial No. 93,201

6 Claims. (Cl. 192—68)

This invention relates to yieldable couplings or transmission connections.

This invention has utility when incorporated in couplings, especially from internal combustion engines for driving motor vehicles wherein the power is effective through springs as a yieldable transmission which may have a succeeding positive pick up for the driving, and take-up against play or back lash, although it may operate properly in reverse direction driving.

Referring to the drawings:

Fig. 1 is a fragmentary view of a motor vehicle having an embodiment of the invention incorporated therewith;

Fig. 2 is a view, with parts broken away, of a clutch including the transmission connection of the invention herein;

Fig. 3 is a section on an enlarged scale, through the disk and its assembly as a unit;

Fig. 4 is a fragmentary side view of the disk from the left of Fig. 3;

Fig. 5 is a view of the disk unit from the right of Fig. 3, parts being broken away;

Fig. 6 is a detail view of the anchor bearing for a spring outer terminus;

Fig. 7 is a view similar to Fig. 5, with the cover plate in position over the central springs;

Fig. 8 is an enlarged view of the springs of Fig. 7, with the cover plate in section; and Fig. 9 is a section on the line IX—IX, Fig. 8.

Motor vehicle 1 is shown having internal combustion engine 2 provided with crank shaft 3 to fly wheel 4 in housing 5. Operation of clutch pedal 6 is effective through rock shaft 7 and arm 8 to overcome the action of springs 9 and shift clutch member 10 to release two ply sheet metal disk 11 and friction or composition rings 12, 13, fixed on the sides of the periphery thereof, thereby throwing such out from frictionally held relation with the fly wheel 4 to disconnect driving of shaft 14, which extends to the transmission and is thereby ineffective to propel the vehicle 1. The composition or friction-providing rings 12, 13, are anchored with the sheet metal disks 11 by rivets 15. The disks 11 have annular series of openings 16 which may be engaged by rivets 17 in mounting plate 18 as a hub, having an annular series of teeth 19. Between these teeth 19 there is clearance 20.

Fixed with the driven shaft 14, having fluted terminus 21, is the fluting or key portion 22 of sleeve member or element 23. This element 23 normally protrudes through central opening 24 in the disks 11. This element 23 has cylindrical portion 25 terminating in shoulder 26 having an annular series of teeth 27 which, in the assembly herein, protrude into the clearance portions 20 between the teeth 19, where they provide latitude for relative angular shifting between the element 23 and the disks 11. The rivets 17 assemble with this hub element 18, cover disk or plate 28. This plate 28 provides a housing for the meshing portions of the teeth 27. There is provision for relative angular shifting of the plate 18 thereabout in a common plane. There is accordingly herein a clearance for angular shifting of, say in excess of 5°. However, with the drive, say from the disks 11 through the teeth 19 as against the teeth 27, there may be a positive transmission.

The disks 11 have an annular series of openings 29 for rivets 29' engaging flange 30 of a housing having cylindrical portion 31 and disk portion 32 extending inward to opening 33 about cylindrical portion 34 of the sleeve or element 23. This housing 31, 32, is provided with a pair of diametrical openings 35. These openings 35 have, in the ledge of the wall 31, at one side thereof, cylinders 36 having slots 37 embracing the wall 31 of the respective openings 35. These cylinders 36 provide bearings or seats for return bend or hook portions 38 as the outer termini of helical springs 39, shown as slightly over 360° each in extent. These respective springs 39 have inwardly directed termini 40 to engage in grooves 41, diametrically disposed in enlargement 42 of the sleeve 23 on the side of the shoulder 26 away from the cylindrical portion 25. With these termini 40 engaged in the seats or bearings 41 and torsion placed thereon in assembly of the unit with the disks 11, there is effected a pulling of the teeth 19, 27, into one limit of engagement therebetween.

In this assembly, the engagement is desirably such that upon operation of the motor 2, to propel the vehicle 1, the transmission is such that it will first wind the springs 39 an additional amount to overcome the torsion, and thereby take up some concussions in the way of smoothing out or giving flexibility to the power transmission before any positive drive takes place, when the teeth 19, 27, are shifted into the limit for positive drive transmission.

The housing 31, 32, is a housing for the yieldable means or springs, and the device is accordingly one which is thus readily assembled as a completely housed unit for simple installation as a substitute clutch disk unit.

These springs 39 as herein shown have reduced cross-section portion 43 toward the hook or inner terminus 40. In practice this may be a milled out portion to give a tapering effect to the spring from its maximum cross-section mid-portion 44. There is thus an undercut for the hook terminus 40 independently of weakening the metal by bending or otherwise distorting to obtain the anchoring terminus.

Besides tapering toward this inner terminus 40 by the section 43 from the maximum cross section mid-portion 44, there is additional tapering portion 45 to the outer anchor or hook terminus 38. In practice these torsion springs 39, under driving load between the portions 40 and the portions 44, tend to draw inward for a seating against the cylindrical portion 42 of the sleeve 23. The load strain in the torsion action seems to be more severe in this inner portion of the spring than away from this first 180° portion.

Accordingly, in order that this torsion may not be localized in the region 44, there is provided by the tapered portion 45, a distribution of this distortion from load action. This is a factor toward uniform load resistance in the operation of this connecting device. Further, it is a factor in strengthening of the connection with longevity to withstand a great amount of operation, even to abuse. The spring adjustments may be such as to have the driving through the springs as a normal condition and the positive driving only as the extreme condition or in the instance of failure of a spring or springs.

Instead of the teeth 19, 27, and the clearance 20, the enlargement 23 may carry semi-eccentric sections 46 (Figs. 8, 9) as spring guides or rests in the central region. These sections 46 are fixed with the part or sleeve element 23 and from the inner offset ends 40 in the direction of the spring extent initiate the spiral, while limiting the spring displacement in torsion contraction thereof.

In each of these resting means or sections 46, there is a pin 47 (Figs. 7, 8, 9) protruding laterally from the plane of the disk 11 into back lash or clearance-providing openings 48 in cover plate 49. This cover plate 49 is assembled with the sheet metal disk 11 by the rivets 29'. From these inner termini or heads 40 spiral springs 50 extend to their outwardly offset termini 38, which are relatively angularly shiftable as to the inner termini 40 in effecting the torsion displacement or wrapping for the inner portions of these spiral springs to hug the semi-eccentric sections 46. In this form a cam-like rest 46 permits uniform cross-section for the spiral spring between the inwardly offset inner terminus 40 and the outwardly offset outer terminus 38. It is to be noted these termini are thus outward from the nesting portions of the respective springs.

What is claimed and it is desired to secure by Letters Patent is:

1. A flexible transmission comprising a pair of torsion springs in a common plane, said springs having inner and outer termini, anchoring means for the inner termini of the springs, additional independent anchoring means for the outer termini of the springs, said outer termini comprising slotted cylindrical members, and a housing engaging the slotted portions of the members, while the cylindrical portions provide bearings for the spring termini.

2. In a device of the character described, the combination of a clutch disc, a hub for said disc, said hub and disc being rotatable about a common axis and having limited relative rotary movement therebetween, a hollow cover secured against said clutch disc, said cover having an arcuately-extending wall provided with an opening therethrough, a spring in said cover having one of its ends anchored on said hub and having at its other end a hook-like connecting portion, and an anchor member in said opening engaged by said hook-like portion, said anchor member being a partially-slit, substantially-cylindrical body applied to the portion of said arcuately extending wall which defines an edge of said opening.

3. A flexible transmission comprising torsion spring means in a plane, said spring means having inner and outer termini, anchoring means for the inner termini of the spring means, limiting means for spring means displacement in torsion from said anchoring means, additional relatively-angularly-shiftable anchoring means for placing said spring means under torsion, a clutch disk fixed against shifting relatively to one of said anchoring means, and a cover plate fixed against shifting relatively to the disk, said disk and cover plate providing a chamber therebetween for the spring means, said clutch disk having its working face radially outward from the spring means.

4. A flexible transmission comprising a pair of torsion spiral springs in a common plane, said springs having inner and outer termini, anchoring means for the inner termini of the springs, spiral contour-directing limiting means for spring displacement in torsion from said anchoring means, additional independent relatively-angularly-shiftable anchoring means for the outer termini of the springs for placing the springs under torsion, a clutch disk fixed against shifting relatively to the outer termini anchoring means, and a cover plate fixed against shifting relatively to the disk, said disk and cover plate providing a chamber therebetween for the springs, said clutch disk having its working face radially outward from said springs.

5. A flexible transmission comprising a pair of torsion spiral springs in a common plane, said springs having inner offset and outer offset termini, anchoring means for the inner termini of the springs, semi-eccentric limiting means for spring displacement in torsion from said offset anchoring means, additional independent relatively-angularly-shiftable anchoring means for the outer offset termini of the springs for placing the springs under torsion, a clutch disk mounting the outer termini anchoring means against shifting relatively to said disk, and a cover plate including a cylindrical portion by which it is offset from and fixed against shifting relatively to the disk, said disk and cover plate providing a chamber therebetween for the springs, said clutch disk having its working face radially outward from said springs.

6. A flexible transmission comprising a pair of torsion spiral springs in a common plane, said springs having inner offset and outer offset termini in said plane and abutments coplanar with the springs providing anchoring means for the inner termini of the springs including a hub, said hub having from said abutments semi-eccentric enlargement means for limiting inward displacement of the springs under torsion, additional independent relatively-angularly-shiftable anchoring means for the outer offset termini of the springs for placing the springs under torsion, a clutch disk mounting the outer termini anchoring means, and a cover plate including a cylindrical portion by which it is offset from and fixed with the disk and therebetween providing a chamber for the springs.

LATTA O. DAVIS.